United States Patent
Marshall et al.

(10) Patent No.: US 6,619,946 B1
(45) Date of Patent: Sep. 16, 2003

(54) APPARATUS FOR TRIMMING AND PERFORMING A SECOND OPERATION ON PLASTIC CONTAINERS

(75) Inventors: Harold James Marshall, Forest, VA (US); Mohamed Hachem Saadi El Hachem, Lynchburg, VA (US); Ray Mardis Clem, Rustburg, VA (US)

(73) Assignee: Delaware Capitol Formation, Inc., Wilmington, DE (US)

( * ) Notice: Subject to any disclaimer, the term of this patent is extended or adjusted under 35 U.S.C. 154(b) by 174 days.

(21) Appl. No.: 09/698,281

(22) Filed: Oct. 30, 2000

Related U.S. Application Data

(63) Continuation-in-part of application No. 09/620,575, filed on Jul. 20, 2000, now abandoned.

(51) Int. Cl.⁷ .............................................. B29C 49/74
(52) U.S. Cl. .................... 425/305.1; 425/392; 425/394; 425/403.1; 425/806; 83/914
(58) Field of Search ............................. 425/305.1, 392, 425/394, 403.1, 806, 527; 264/533, 534, 536, 296; 83/410.9, 411.1, 411.5, 914

(56) References Cited

U.S. PATENT DOCUMENTS

| | | | |
|---|---|---|---|
| 3,818,785 A | * 6/1974 | Wakabayashi | 82/101 |
| 3,838,653 A | 10/1974 | Larkin et al. | 72/377 |
| 3,924,315 A | * 12/1975 | Cady et al. | 29/562 |
| 4,614,018 A | * 9/1986 | Krall | 29/33 J |
| 6,062,408 A | 5/2000 | Beck et al. | 215/379 |

OTHER PUBLICATIONS

"CT Series Rotary Can Cutting and Trimming Machine", CT500 Rotary Trimmer Brochure, (1994–1995), Belvac Precision Leadership.
CT500 Machine Manual. Old Revision#0 Published Jan. 1994, 10 pages.
CT500 Machine Manual. Recent Revision #4 Published Jan. 2000, 7 pages.

* cited by examiner

*Primary Examiner*—James P. Mackey
*Assistant Examiner*—Donald Heckenberg
(74) *Attorney, Agent, or Firm*—Foley & Lardner

(57) ABSTRACT

An apparatus and method for trimming and performing a second operation on containers, such as plastic containers. The apparatus comprises modular container processing stations. One modular station is a pretrim station including a starwheel, blade, and rollers for spinning the containers. Another modular station is a trimming station which includes a plurality of trim heads for precisely trimming containers. The trim heads include a C-knife, an inner knife, and a neck control ring assembly. Another modular station is a second station including a plurality of second station heads. The second station heads contact a trimmed container as the container is continuously spun. The integrated apparatus also includes a carousel which conveys the containers from station to station and includes a number of spindles which may spin the containers during processing. The apparatus may also include a scrap removal assembly which collects scrap rings and blows them away to a scrap collector.

15 Claims, 19 Drawing Sheets

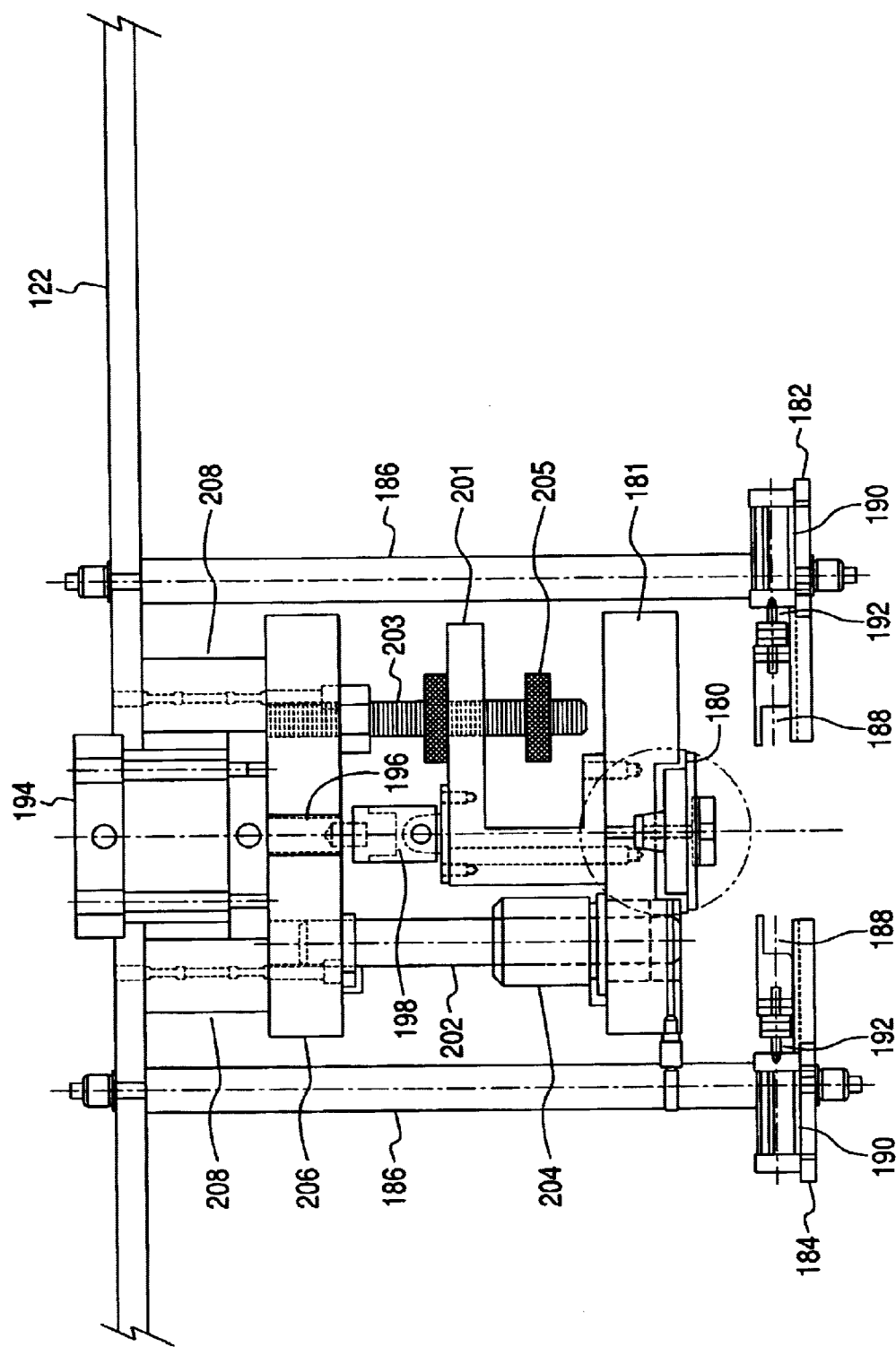

APPARATUS FOR TRIMMING AND PERFORMING A SECOND OPERATION ON PLASTIC CONTAINERS

This application is a Continuation-In-Part of U.S. application Ser. No. 09/620,575, filed Jul. 20, 2000 now abandoned.

FIELD OF INVENTION

This invention relates generally to an apparatus and corresponding method for pretrimming, trimming and performing a second operation on containers, such as plastic containers, and for trim scrap removal. The invention also relates to apparatii and corresponding methods for performing these functions separately in a modular fashion.

BACKGROUND OF THE INVENTION

Containers, such as plastic bottles, are often formed by blow molding an injection molded preform. This process along with some additional operations are used to form "wide mouth containers". These additional operations include, for example, pretrim and trimming operations, where a desired amount of material is cut from the container in one or more steps. Pretrim operations comprise performing a rough cut on the container to remove the bulk of the unwanted material prior to trimming. The trimming operation accurately trims the containers to a desired length. Once the desired amount of material is cut from the container, a curling operation may be performed. The curling operation smoothes and shapes the cut edge of the container.

One example of a trim station which performs trimming operations on containers is the CT500 trim station, where the CT500 is designed for trimming aluminum and steel containers. The CT500 trim station employs a trim head including an inner knife and an opposing knife with a D shaped blade. In the CT500 trim station, the container is supported by a workrest that is shaped like the inside of the container. The workrest is an integral part of the CT500 trim station. The CT500 trim station uses a knurling gear and a cutting insert that cuts a scrap trim section from the container, and then forms the scrap in a zigzag sheet shape. The CT500 trim station itself includes an integral vacuum assembly for holding the container to be trimmed. The scrap trim section is then ejected using forced air.

BRIEF SUMMARY OF THE INVENTION

It would be desirable to provide an apparatus for processing containers, such as blown "wide mouth" containers into finished containers, where the processing components of the apparatus are provided in modular form. Thus, the apparatus may comprise one or more of the processing components as desired. It would further be desirable to provide an apparatus where the processing components may be operated independently. Thus, even if the apparatus comprises a number of processing components, the user may choose to operate only some of the components at a given time. Such a modular apparatus provides increased flexibility in processing blown containers which may be input into the apparatus in different stages of processing.

The trim station according to one aspect of the present invention does not require an integral vacuum assembly to hold the container. Instead the container may be held by a support which is outside the trim station itself. The trim station employs a C-knife in conjunction with an inner knife for performing the trim operation. The scrap trim section (or scrap ring) cut during the trim operation is held between the C-knife and inner knife until the C-knife is rotated to a home position. The scrap may be collected by a scrap tray and blown away by positive air pressure.

In accordance with one aspect of the present invention, there is provided an apparatus for trimming and performing a second operation on plastic containers, where the apparatus comprises a carousel having a main shaft, which conveys the containers about a central axis of the main shaft; a trim station positioned adjacent a first portion of the carousel, the trim station including a plurality of trimming heads which trim respective containers conveyed around the carousel thereby producing trimmed containers; and a second station positioned adjacent a second portion of the carousel, the second station including a plurality of second station heads which operate on the trimmed containers.

In accordance with another aspect of the present invention, there is provided an apparatus for trimming containers, where the apparatus comprises a plurality of trimming heads which trim respective containers, each of the trimming heads comprising a C-knife with a blade shaped as a C and an inner knife, wherein each of the respective C-knife and inner knife trim a respective container by simultaneously engaging the respective container; and a translation mechanism which simultaneously lowers each of the trimming heads to a respective container.

In accordance with another aspect of the present invention, there is provided an apparatus for pretrimming and conveying containers, wherein the apparatus comprises a starwheel having a starwheel central axis which engages and separates the containers and conveys the containers around the starwheel central axis; rollers which spin the containers conveyed around the starwheel central axis; a guide which guides the containers conveyed around the starwheel central axis; and a pretrim blade which pretrims the containers.

In accordance with another aspect of the present invention, there is provided an apparatus for operating on trimmed containers, wherein the apparatus comprises a plurality of heads which contact a portion of the trimmed containers as the containers are continuously rotated; and a translation mechanism which simultaneously lowers each of the heads to a respective container.

In accordance with another aspect of the present invention, there is provided an apparatus for removing scrap rings from trimmed containers, wherein the apparatus comprises a scrap removal tray; a translation mechanism which translates the scrap removal tray to a first regions and under the scrap rings so that the scrap removal tray may collect the scrap rings, and translates the scrap removal tray away from the first region so that the scrap removal tray removes the scrap rings from the first region; a scrap collector; and at least one air jet which blows the scrap rings in the scrap removal tray towards the scrap collector so that the scrap trim section collector collects the scrap rings from the scrap removal tray.

In accordance with another aspect of the present invention, there is provided a method of trimming and performing a second operation on a container, wherein the method comprises conveying the container along a path; trimming the container conveyed along the path as the plastic container is continuously spun about a central axis of the container to produce a trimmed container having a wide mouth; and operating on the trimmed container conveyed along the path including performing an operation on the mouth of the trimmed container as the trimmed container is continuously spun about the central axis.

In accordance with another aspect of the present invention, there is provided a method of trimming and performing a second operation on containers, wherein the method comprises conveying a plurality of containers along a path; trimming each of the plurality of containers conveyed along the path as each container is continuously spun about a central axis of the container to produce a plurality of trimmed containers having respective mouths; and operating on each of the plurality of trimmed containers conveyed along the path including performing an operation on the respective mouths of the trimmed containers.

In accordance with another aspect of the present invention, there is provided a method of trimming a container with a trim head having a C-knife with a C shaped blade with a gap in the blade and an inner knife, wherein the method comprises conveying the container to a position adjacent the trim head; providing a C-knife in a home position with the gap towards the inner knife; translating the trim head with the C-knife in the home position towards the container; rotating the C-knife in a first rotation so that the C-knife and the inner knife both engage the container and form a trimmed container, wherein the first rotation is not a full revolution; translating the trim head away from the trimmed container; and rotating the C-knife in a second rotation so that the C-knife is again in a home position with the gap towards the inner knife.

In accordance with another aspect of the present invention, there is provided a method of removing a scrap ring wherein the method comprises translating a scrap removal tray to a first region under a trim head in a first translation; collecting the scrap ring in the scrap removal tray at the first region; translating the scrap removal tray from the first region to a second region in a second translation; and blowing the scrap ring from the scrap removal tray to a scrap collector.

In accordance with another aspect of the present invention, there is provided a method of finishing the edge of a trimmed container with an edge finishing tool wherein the method comprises conveying the trimmed container to a position adjacent the edge finishing tool; translating an edge finishing tool within and contacting the trimmed container; continuously spinning the container while the container is contacting the edge finishing tool to form a finished container with a finished edge; and conveying the finished container away from the edge finishing tool.

In accordance with another aspect of the present invention, there is provided a method of pretrimming a container, wherein the method comprises conveying the container via a starwheel between the starwheel and a guide; and pretrimming the container while the container is conveyed between the starwheel and the guide, and while the container is continuously spun by rollers.

In accordance with another aspect of the present invention, there is provided a method of precise container positioning for a container trimming operation, wherein the method comprises translating a trim plate holding a plurality of trim heads for trimming the respective containers, each trim head having a respective neck control ring assembly mounted thereon; trapping a container between a control ring of a respective neck control ring assembly and a spindle support, the control ring contacting a top portion of the container and the spindle support contacting a bottom portion of the container.

BRIEF DESCRIPTION OF THE DRAWINGS

FIG. 11 is a cross sectional view of a curling station;

DETAILED DESCRIPTION OF THE INVENTION

Figure 1:
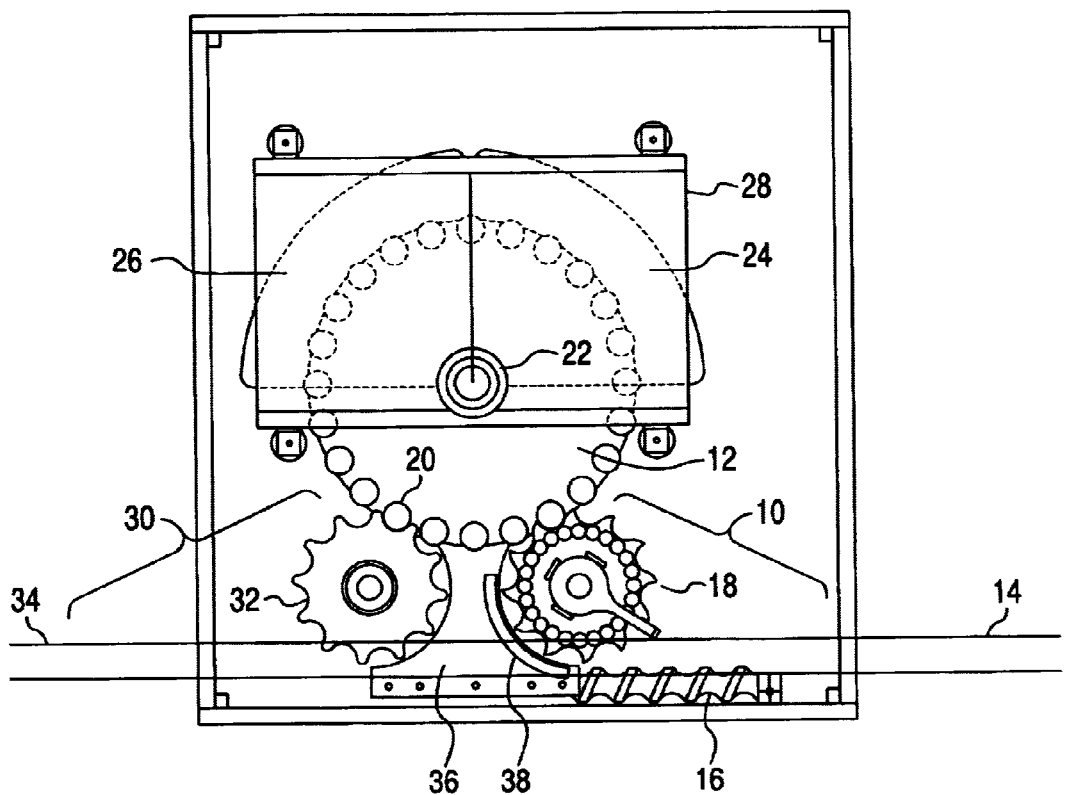
FIG. 1 is a diagram of an apparatus according to one embodiment of the present invention.

FIG. 1 is a diagram of an apparatus according to one embodiment of the present invention. The apparatus includes a number of component stations which perform respective processes on containers, such as blow molded containers. In this embodiment, the apparatus includes components which perform a pretrim, trim, and a second operation, such as a finishing operation. The apparatus includes an infeed assembly 10 which conveys the containers, towards a rotating carousel 12. In general the infeed assembly may include any one of a conveyor, starwheel, feed screw, and other assemblies for conveying the containers to the carousel 12. Of course, the infeed assembly may include a combination of assemblies for conveying containers. In the preferred embodiment of FIG. 1 the infeed mechanism includes all of a conveyor 14, feed screw 16 and starwheel 18. The means of conveying will depend upon the type of container to be conveyed. For example, some containers of irregular shape may require a feed screw as part of the infeed assembly.

In the preferred embodiments, the starwheel 18 may also includes a blade 38 for pretrimming a blown container. In this case the starwheel 18 is not only part of the infeed assembly 10, but also functions as a pretrim processing station. The blade 38 performs a rough cut to the blown container as detailed below. The containers are conveyed about the rotating starwheel by the starwheel prongs and the guide 36.

The carousel 12 includes a number of spindles 20 which hold and may spin the containers as the containers are conveyed around the central axis of a main shaft 22 of the carousel. The carousel 12 conveys the containers to different process stations 24 and 26 adjacent the carousel for processing of the containers. The processing stations 24 and 26 are attached to an elevator support 28, which may be raised or lowered relative to the carousel 12 and the containers. The processing stations 24 and 26 are below the elevator support 28 as indicated by the dotted lines defining the processing stations. The carousel 12 is also below the elevator support 28 as indicated by the dotted lines defining the portion of the carousel 12 which is directly below the elevator support 28.

In the embodiment of FIG. 1 the processing stations 24 and 26 and the elevator support 28 are above the carousel 12 and the containers. However, processing stations 24 and 26 and elevator support 28 may also be below or to the side of the carousel. For example, the carousel 12 may be inverted with the containers below the carousel, and the processing stations below the containers. It is only important that the processing stations 24 and 26 are close enough to the containers so that processing tools from the processing stations 24 and 26 may be moved to process the containers.

In this embodiment, the processing stations 24 and 26 are a precision trim station and a second station, respectively. The second station performs an operation on the trimmed container conveyed from the trimming station such as curling the trimmed container. The precision trim station 24 includes a plurality of trim heads for trimming the containers conveyed from the infeed assembly 10. After the containers are processed at the trim station 24, the containers are conveyed to the second station 26 to be processed. The second station 26 includes a plurality of second station heads for operating on the containers after they have been trimmed. The second station heads may perform a finishing operation, for example. For example, in the finishing operation, the heads may be curling heads that curl the trimmed container, or edge finishing heads that perform an edge finishing operation. FIG. 1 illustrates an apparatus with six spindles 20 adjacent each of the trim station and the second station. In this case, the number of trim heads and second station heads, respectively, at the trim station 24 and the second station 26, is six. Of course, the second station 26 and the trim station 24 may include a number of heads other than six, such as four, or nine, for example.

After processing at one or more processing stations, the containers are conveyed to a discharge assembly 30. The discharge assembly functions to convey the containers processed in the apparatus away from the processing stations. The discharge assembly 30 may include a starwheel, conveyor or other means of conveying. Of course the discharge assembly may include more than one means of conveying. In FIG. 1 both a star wheel 32 and a conveyor 34 are used for conveying in the discharge assembly 30.

Although the embodiment of FIG. 1 includes a trim station and a second station, in operation, one of these stations may be turned off. For example, if the containers to be processed have already been trimmed prior to being input in the infeed assembly, there is no need to perform a trimming operation, and only the second station need be turned on. As another example, it may be desired to only trim the containers at the apparatus and not perform a second operation on them or to perform a second operation on them at another time or at another apparatus. In this case, only the trim station need be operated.

Figure 2:
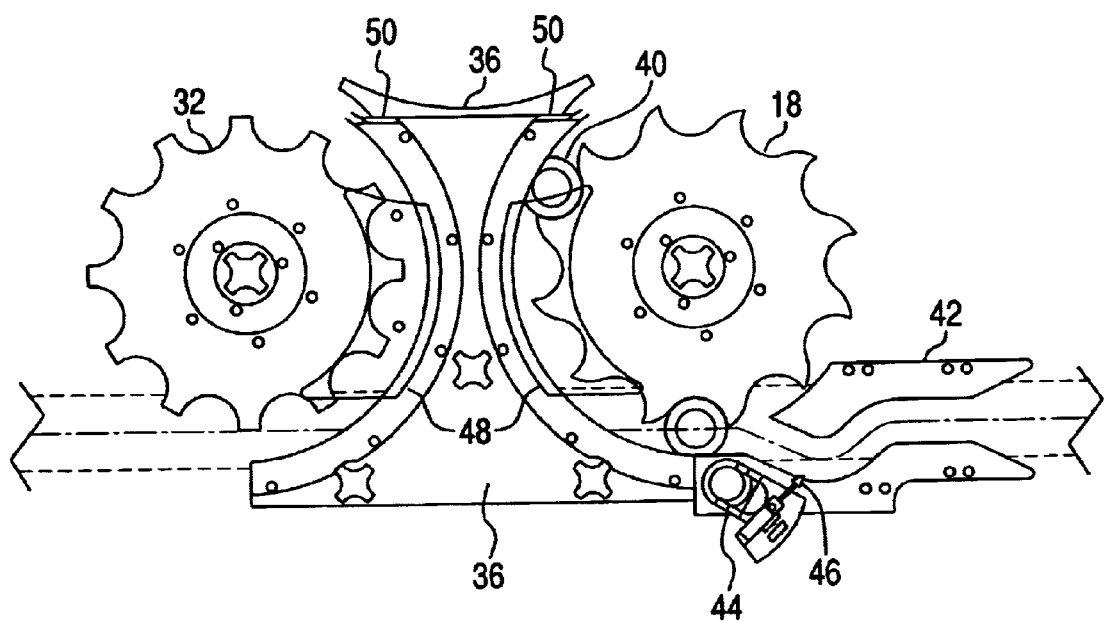
FIG. 2 is an expanded view of the infeed and discharge starwheels shown in the embodiment of FIG. 1.

FIG. 2 is an expanded view of the infeed starwheel 18 and discharge starwheel 32 shown in the embodiment of FIG. 1. However, FIG. 2 does not show a pretrim blade. Containers 40 are conveyed by the starwheel 18 by the prongs of the starwheel 18. Containers arrive to the starwheel as they are guided by rail 42. A container stop 44 with container stop plunger 46 acts to stop the containers as they are guided to the starwheel by the rail 42. The shape of the starwheel 18 is a constant velocity profile to provide a smooth transfer between the conveyor 14 and the spindle 20. Thus, the rotating starwheel acts to separate the bottles to match the pitch of the spindles 20. The guide 36 includes skid plates 48 and guide mounts 50. The guide 36 in FIG. 2 acts as a guide not only for the infeed starwheel 18, but also for the discharge starwheel 32. While FIG. 2 shows the same guide 36 used for guiding containers both for infeed and discharge, a separate guide may also be used for infeed and discharge operations.

The discharge starwheel 32 is not a constant velocity profile because it transfers the containers from the spindles 20 to the conveyor 34. The conveyors 14 and 34 may be separate conveyors or a single conveyor, for example.

Figure 3:
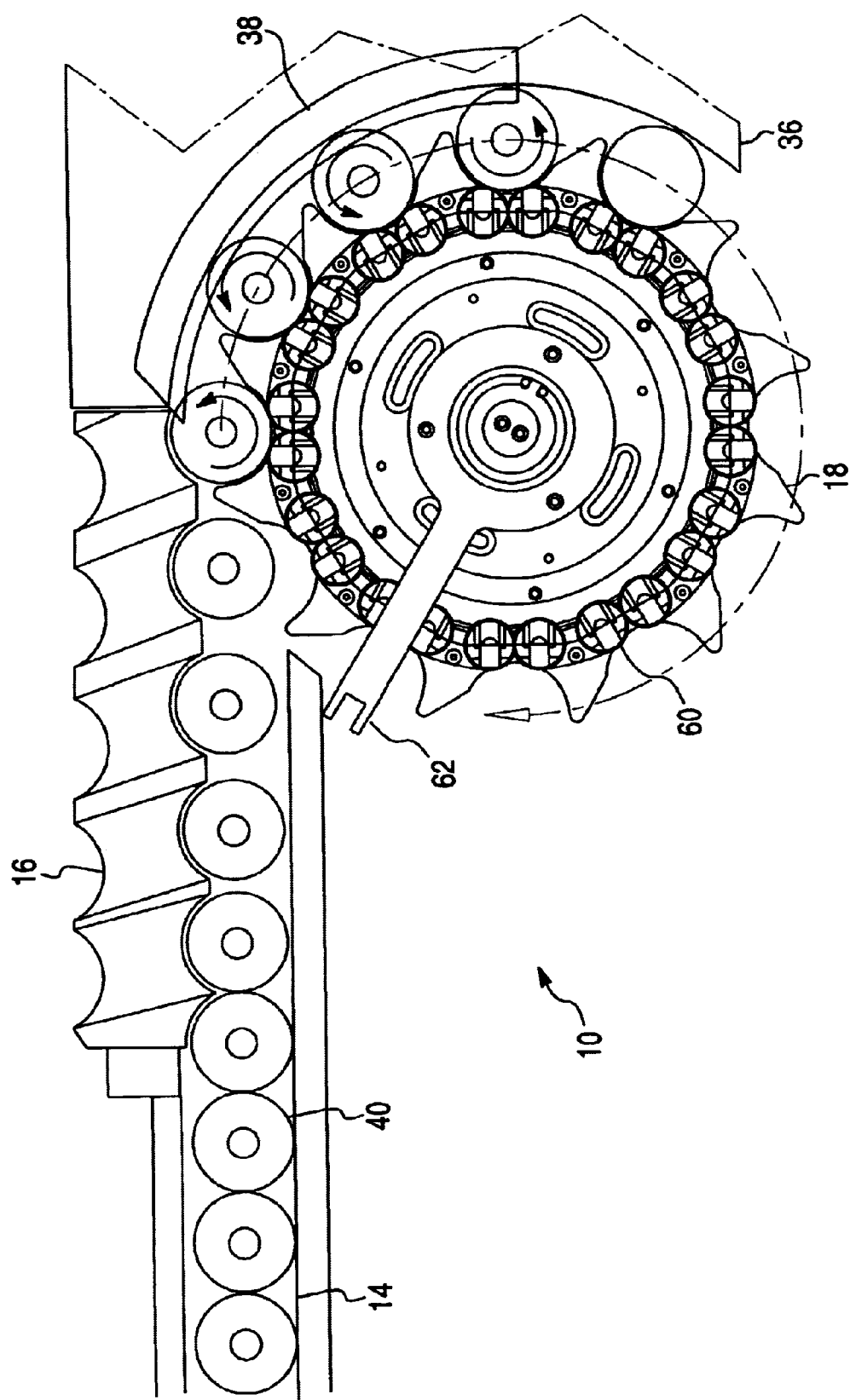
FIG. 3 is, an expanded view of the infeed assembly of the present invention showing parts for the pre-trim operation.

FIG. 3 is an expanded view of the infeed assembly 10 of the present invention. In the embodiment according to FIG. 3, the infeed assembly 10 may also function as a pretrim station with the blade 38 making a rough cut of the containers 40 which are in their blown stage. The infeed/pretrim station 10 includes a conveyor 14 which conveys the containers 40 in their blown stage to a timing screw 16 which sets the timing of the containers 40 as they pass. The timing screw 16 sets the timing by separating and translating the bottles as they pass by the screw rotating about its axis. Thus, the screw 16 conveys and separates the containers 40. Optionally, the timing screw may be omitted, and the separation and timing function may be performed entirely by the constant velocity profile of starwheel 18. As discussed above, the shape of the infeed starwheel 18 is a constant velocity profile to provide a smooth transfer between the conveyor 14 and the spindle 20.

As the containers pass by the blade 38, the blade performs a rough cut of the containers. The infeed/pretrim station also includes rollers 60 which spin the containers 40 as they are conveyed by the blade 38, so that a pretrim segment (not shown) may be completely cut. Without the rollers 60 the containers would not make a full revolution, and thus the pretrim segment would not be completely cut from the container 40. The rollers are driven by pinion gears that mesh with a stationary bull gear. The bull gear remains stationary by the torque arm 62 as the infeed starwheel 18 rotates and thus the rollers counter rotate. The infeed/pretrim station 10 with starwheel 18 and blade 38 functions not only to separate and pretrim the containers 40, but also conveys the pretrimmed containers to a next processing station.

Figure 4:
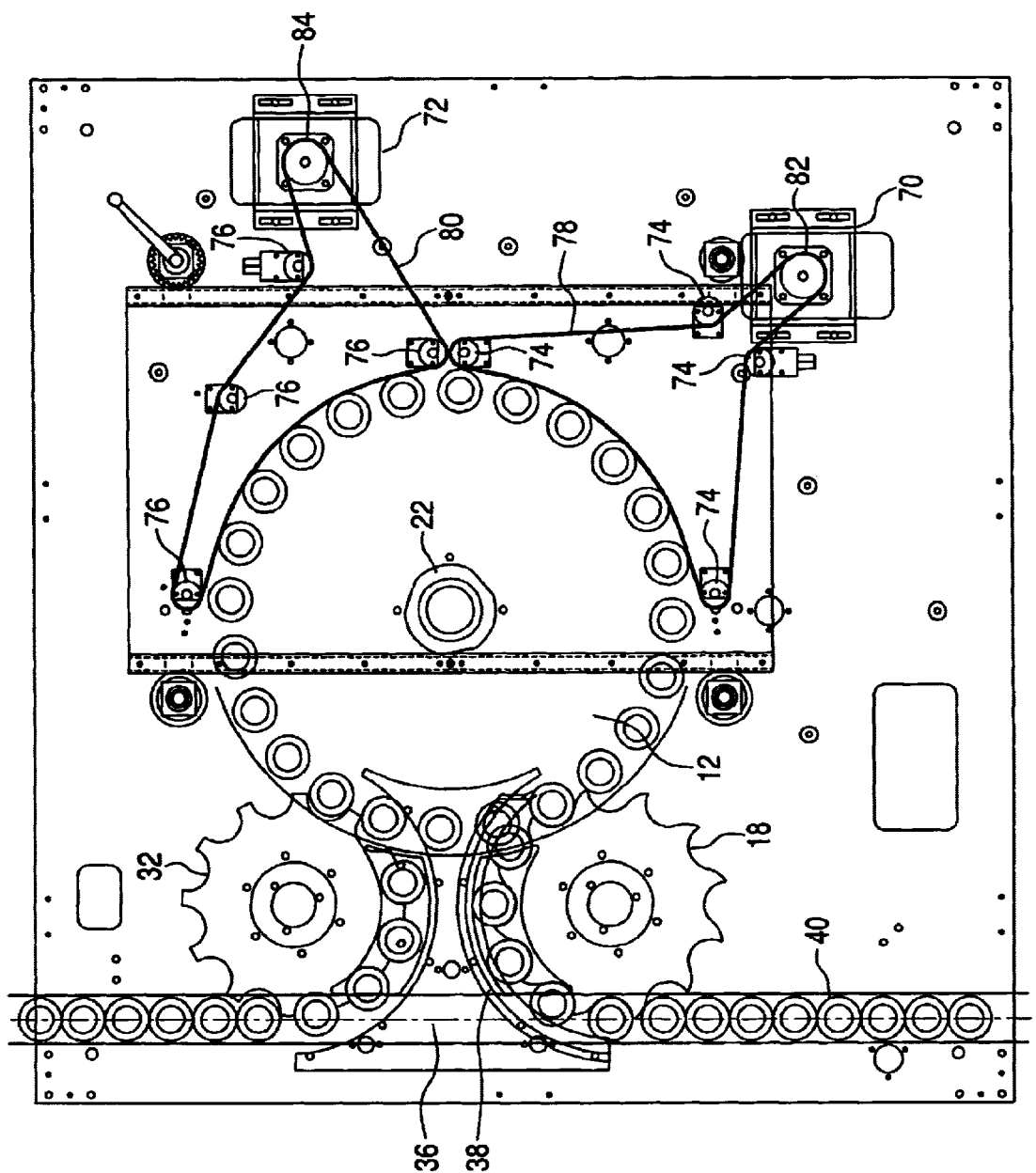
FIG. 4 is a top view of a portion of the apparatus of FIG. 1 showing the independent drive mechanisms for the spindles adjacent to two processing stations.

FIG. 4 is a top view of the apparatus showing the independent drive mechanisms for the spindles adjacent the two processing stations 24 and 26 in FIG. 1. The containers 40 are conveyed by the starwheel 18 to the carousel 12. The containers are positioned on respective spindles (not shown) on the carousel 12. The containers are affixed to the spindles by means of vacuum chucks, for example. The carousel 12 conveys the containers by rotating about the central axis of main shaft 22.

The containers 40 are also rotated about the central axis by the spindles (not shown in FIG. 4) which are directly below the containers. The drive motor 70 provides the driving power to rotate a first group of spindles for the first processing station such as station 24 in FIG. 1. Similarly drive motor 72 provides the driving power to rotate a second group of spindles for the second processing station such as station 26 in FIG. 1. The driving mechanisms for the first and second group of spindles further includes belts 78 and 80 respectively connected to drive motor pulleys 82 and 84 of the drive motors 70 and 72. The driving mechanisms also include idler pulleys 74 and 76 which distribute the respective belts 82 and 84 to contact spindle drive pulleys (not shown in FIG. 4) of the respective first and second groups of spindles. Significantly, the drive motors 70 and 72 may be operated independently. Thus, the spindles need only be rotated for containers within the processing station which is in operation.

Figure 5:
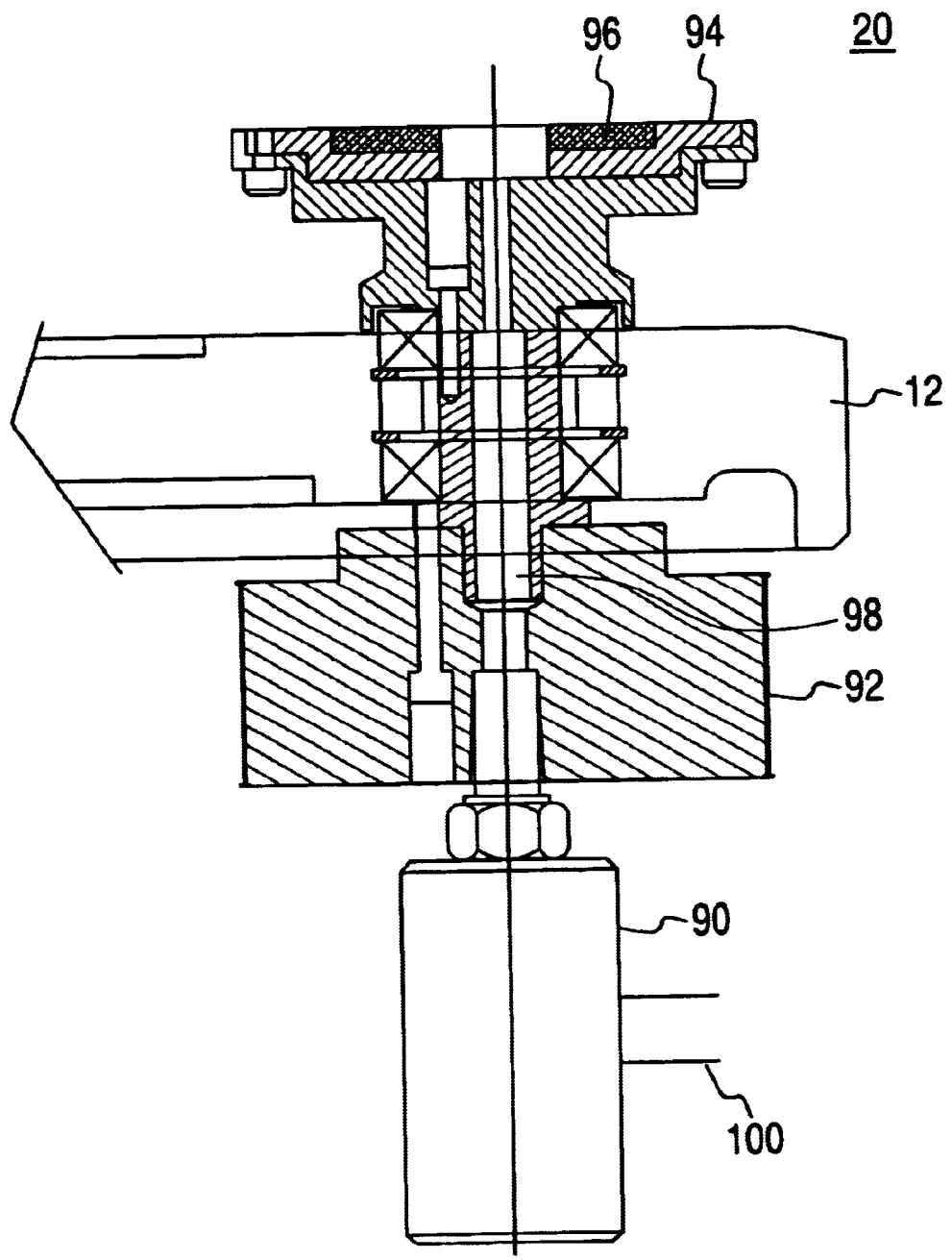
FIG. 5 is a cross-sectional view of a spindle according to the present invention.

FIG. 5 is a cross-sectional view of a spindle 20 according to the present invention. The spindle 20 includes a rotary union 90, which stays fixed as the spindle rotates. The spindle 20 is driven by one of the belts 78 or 80 shown in FIG. 4 which is adjacent the spindle drive pulley 92. The spindle is attached to the carousel 12, with a portion of the spindle passing through the carousel 12 as shown in FIG. 5. The spindle also includes a spindle base 94 with a recess into which fits a container support 96. Preferably the container support 96 is made of a material which allows a container to be closely positioned onto the support 96. For example, rubber may be used for the container support.

The container is positioned tight against the container support 96 by means of a vacuum drawn on the container. In this regard the spindle 20 includes a hollow central shaft 98 along the central axis of the spindle 20. A vacuum hose 100 is attached to the rotary union 90 and the vacuum is pulled through the hollow central shaft 98. The hollow central shaft 98 preferably expands in diameter near the spindle base 94 and container support 96 to provide a vacuum adjacent a larger area of the container resting on the container support 96.

Figure 6:
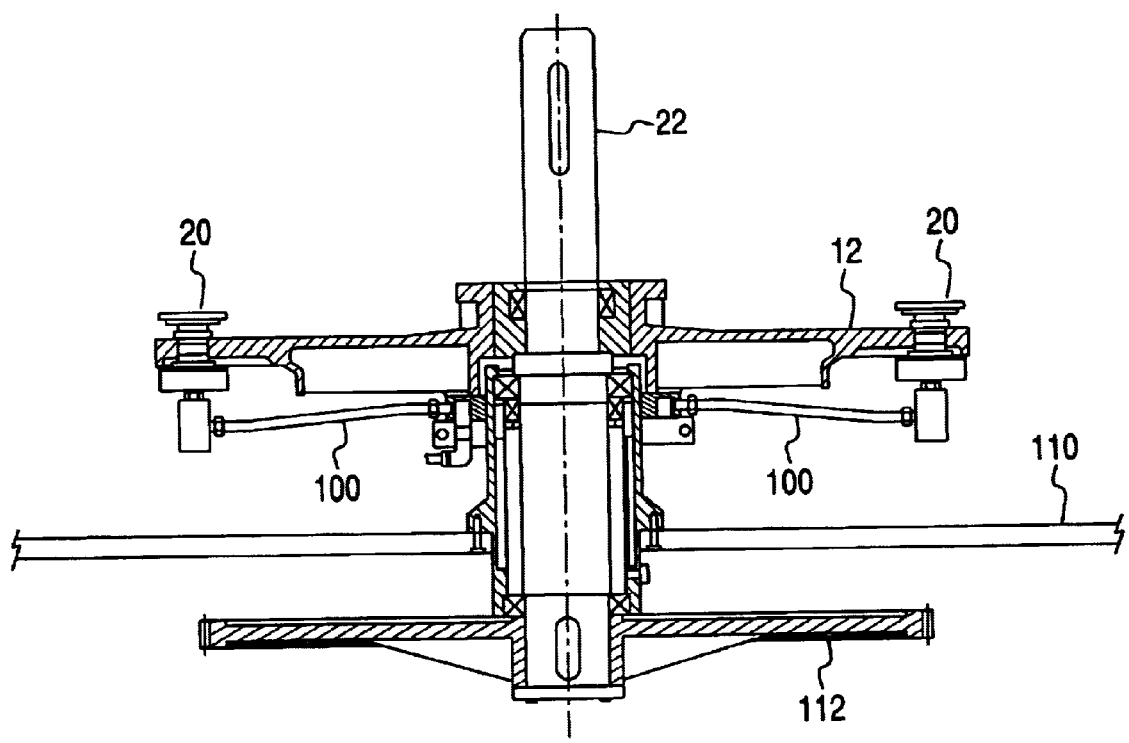
FIG. 6 is a cross sectional view of the carousel portion of an embodiment of the present invention.

FIG. 6 is a cross sectional view of the carousel 12 portion of an embodiment of the present invention. The carousel 12 includes a main shaft 22 which passes through and is supported by a support table 110. The carousel supports the spindles 20, and the vacuum hose 100 attached to the spindles. On the side of the support table 110 opposite to the carousel 12 table, the main shaft 22 is driven by a large gear 112, which in turn is driven by a motor (not shown).

Figure 7:
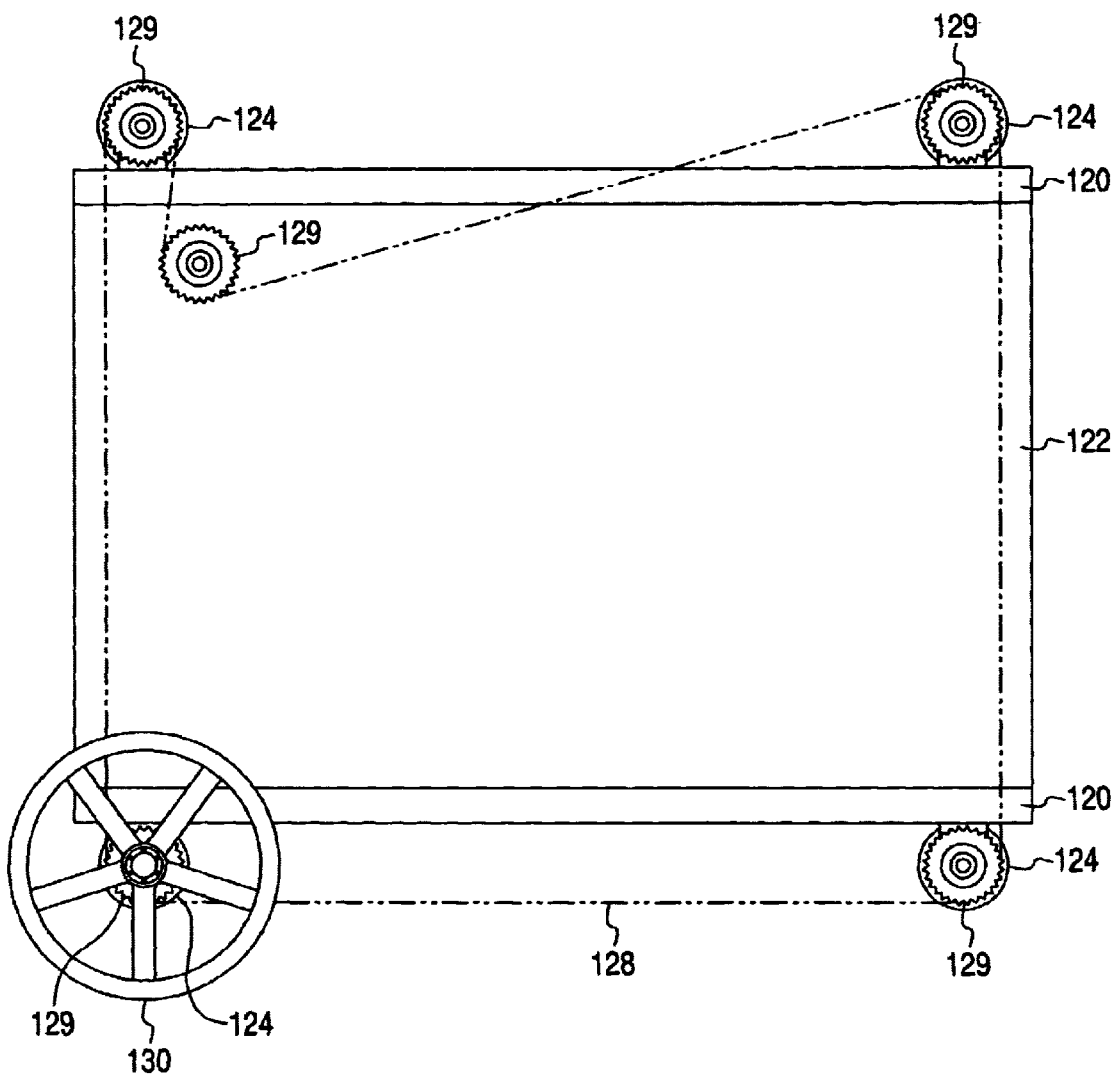
FIG. 7 is a top view of an elevator support which supports the trim station and the curling station.
Figure 7A:
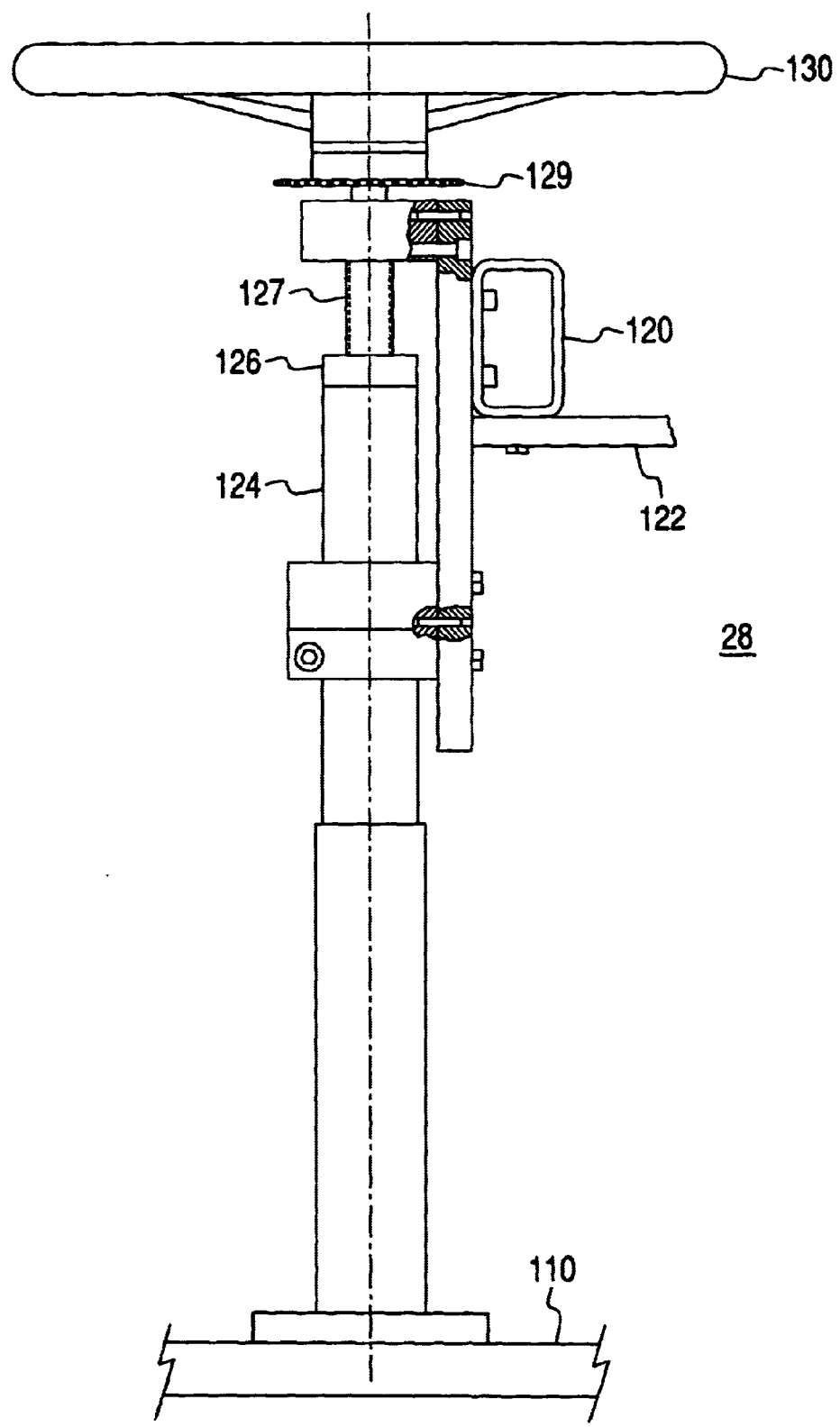
FIG. 7A is a side view of a portion of the elevator support of FIG. 7.

FIG. 7 is a top view of an elevator support 28 which supports the trim station and the second station. FIG. 7A is a side view of a portion of the elevator support 28 of FIG. 7. The elevator support includes beams 120 attached to support plate 122. The support plate 122 supports both the trim station and the second station. Of course, if desired, only one or the other of these processing stations may be implemented in a particular apparatus, and thus only one processing station implemented may be supported by the support plate 122.

The support beams 120 are attached to an upper portion of support posts 124. The support posts 124 each include a stationary threaded bushing 126 and a threaded jack shaft 127 which when rotated will cause the upper portion of the support post to raise or lower depending on the direction of rotation. Each threaded jack shaft 127 is attached to a sprocket 129 and the sprockets are connected to one another via a chain 128. One of the support posts also includes a hand wheel 130. As the hand wheel 130 rotates, the jack shaft 127 which is attached to the base of the hand wheel 130 rotates correspondingly, and because all the jack shafts 127 are connected via the chain 128, they are rotated synchronously. Thus, the top portion of the support posts 124 may be raised or lowered by rotating the hand wheel 130. Likewise the support plate 122, which is attached to the upper support posts via the beams 120, may be raised or lowered by turning the hand wheel 130. Raising or lowering the support plate 122 allows the position of the processing stations to be adjusted relative to the carousel 12. Thus, the processing stations position may be adjusted for different sized containers to be processed by the apparatus of the present invention.

Figure 8A:
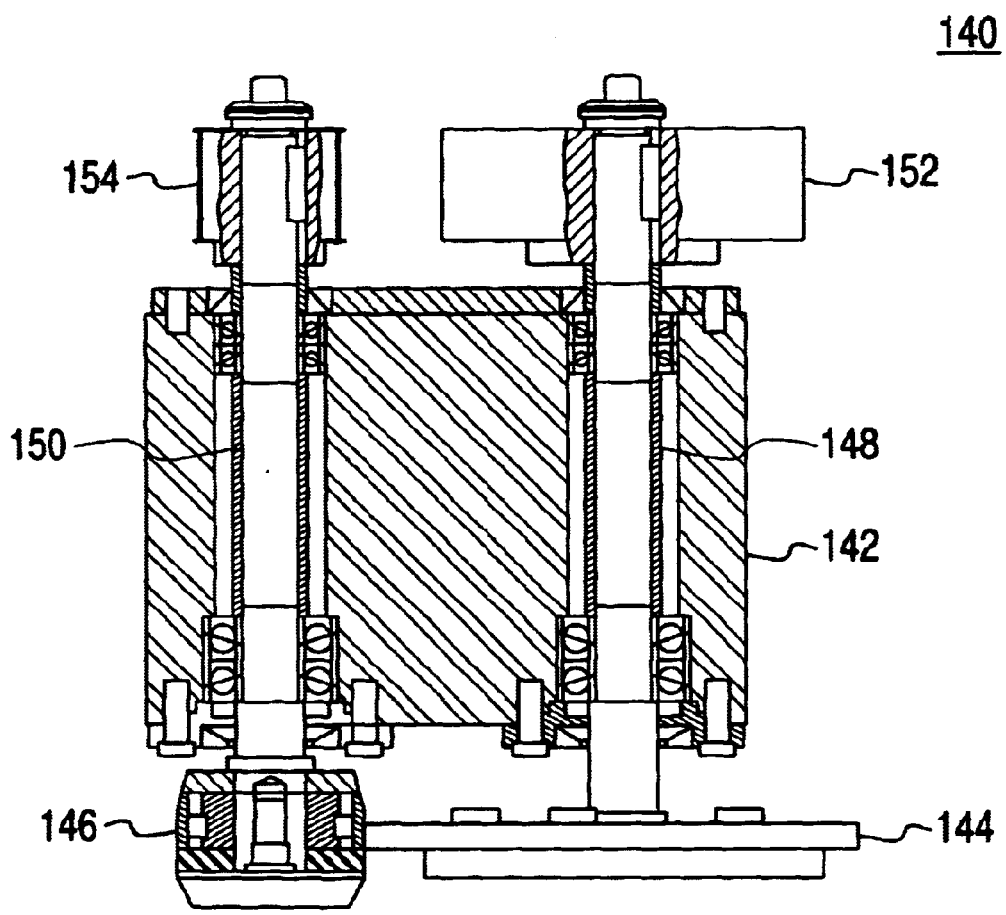
FIG. 8A is a cross sectional view of a trim head of a trimming station according to an embodiment of the invention.

FIG. 8A is a cross sectional view of a trim head 140 of a trimming station according to an embodiment of the invention. The trim head 140 includes a trim head housing 142. The trim head 140 also includes two knives, a C-knife 144 and an inner knife 146. The blade of the C-knife 144 generally will have the shape of a C when viewed from the top. Together the C-knife 144 and the inner knife 146 precisely trim a container. A portion of the inner knife 146 supports the container as the container is cut allowing for a precisely controlled cut. The C-knife 144 and the inner knife 146 are connected via respective shafts 148 and 150 to respective drive pulleys 152 and 154. Both the C-knife shaft 148 and the inner knife shaft 150 pass through the trim head housing 142.

Figure 8B:
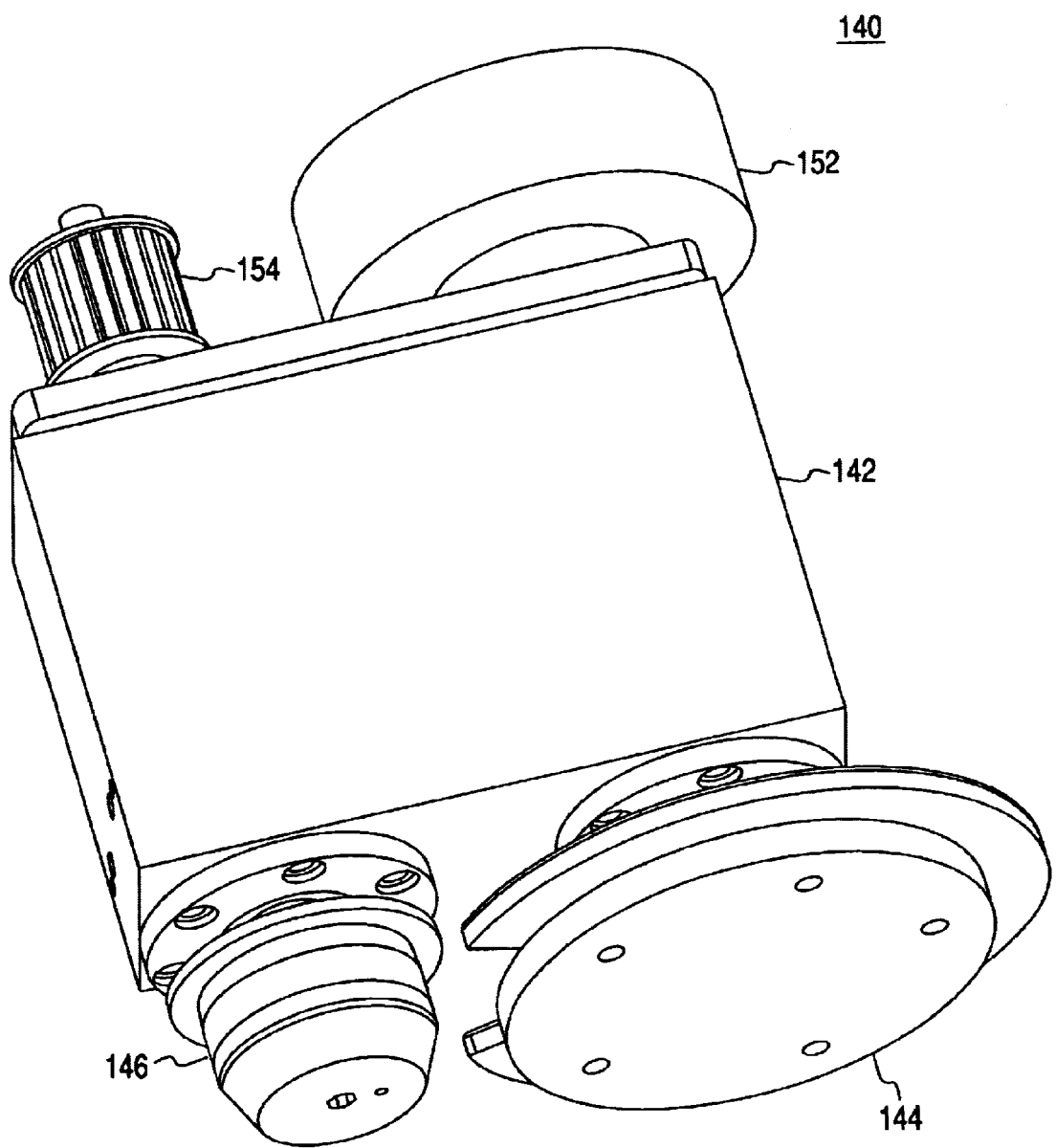
FIG. 8B is another view of the trim head of a trimming station according to an embodiment of the invention.

FIG. 8B is another view of the trim head 140 with C-knife 144, inner knife 146, C-knife drive pulley 152 and inner knife drive pulley 154 shown. In FIG. 8B the C-knife is in a home position, i.e., the gap in the blade of the C knife is towards the inner knife 146. When the trim head is in the home position the trim head may be positioned (lowered) so that the inner knife 146 tangentially contacts the inside of the container, but the C-knife does not. Although the C-knife generally will have the shape of a C, the shape of the C-knife may vary as long as the C-knife may be rotated to both home and engaged positions. Once the container is contacted by the inner knife 146, the inner knife 146 supports the container during the trim operation thus allowing a precise trim of the container. When the container and both knifes are rotated, the blade of the C-knife 144 contacts the container as well. In general, the amount that the C-knife 144 is rotated to contact the container will depend upon the container size. The C-knife 144 will be rotated by less than a full revolution to contact the container.

Figure 8C:
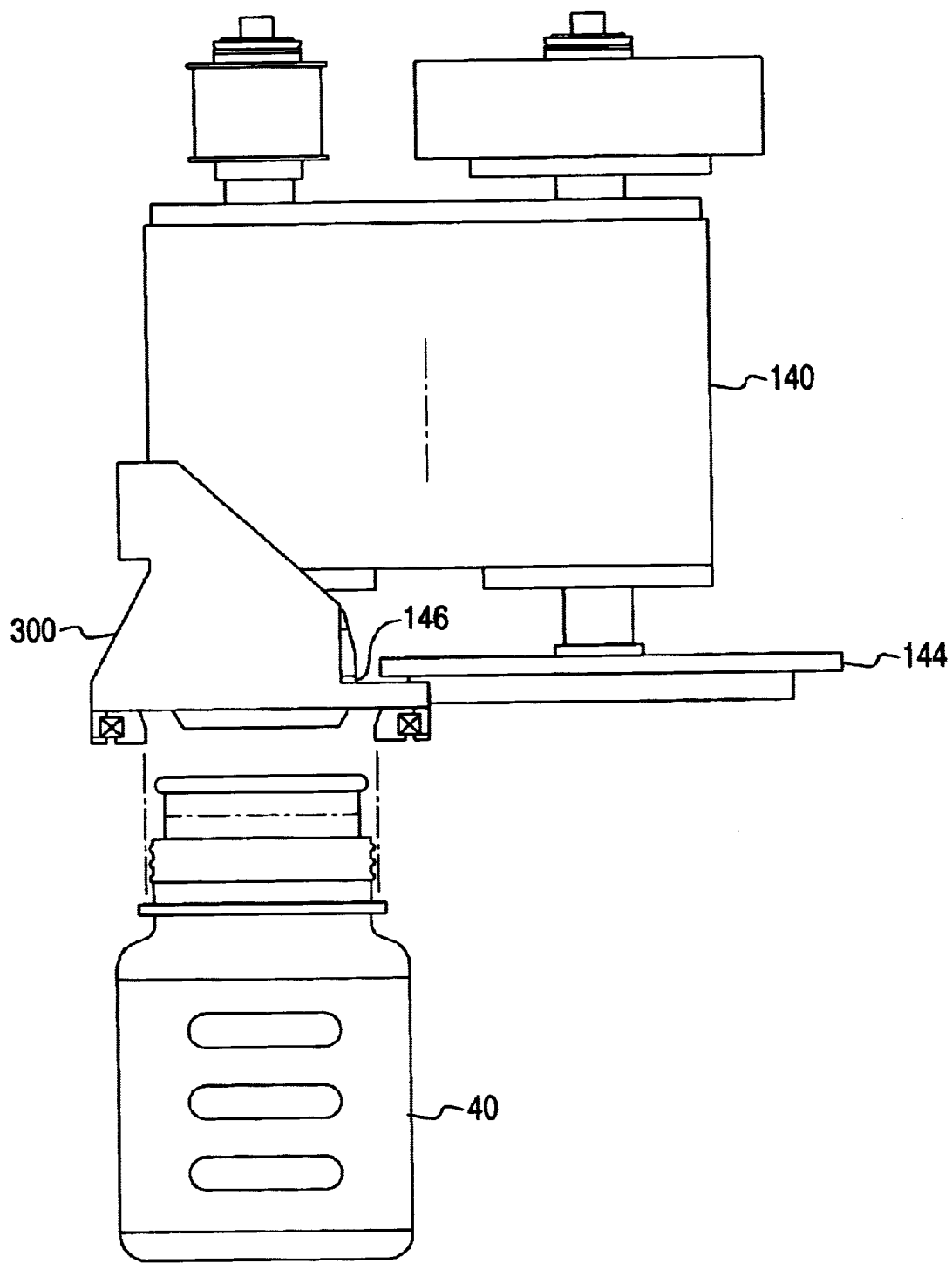
FIG. 8C is a side view of the trim head showing the neck control ring assembly.

FIG. 8C is a side view of the neck control ring assembly 300 attached to the trim head 140 according to an embodiment of the invention. The neck control ring assembly 300 is not shown in FIGS. 8A and 8B for clarity. The neck control ring assembly 300 moves with the trim head 140 up and down. As the trim head is lowered for the trimming operation to begin, the neck control ring assembly 300 is positioned on the largest neck ring of the container 40 for accurate positioning of the container with respect to the knives 146 and 144.

Figure 8D:
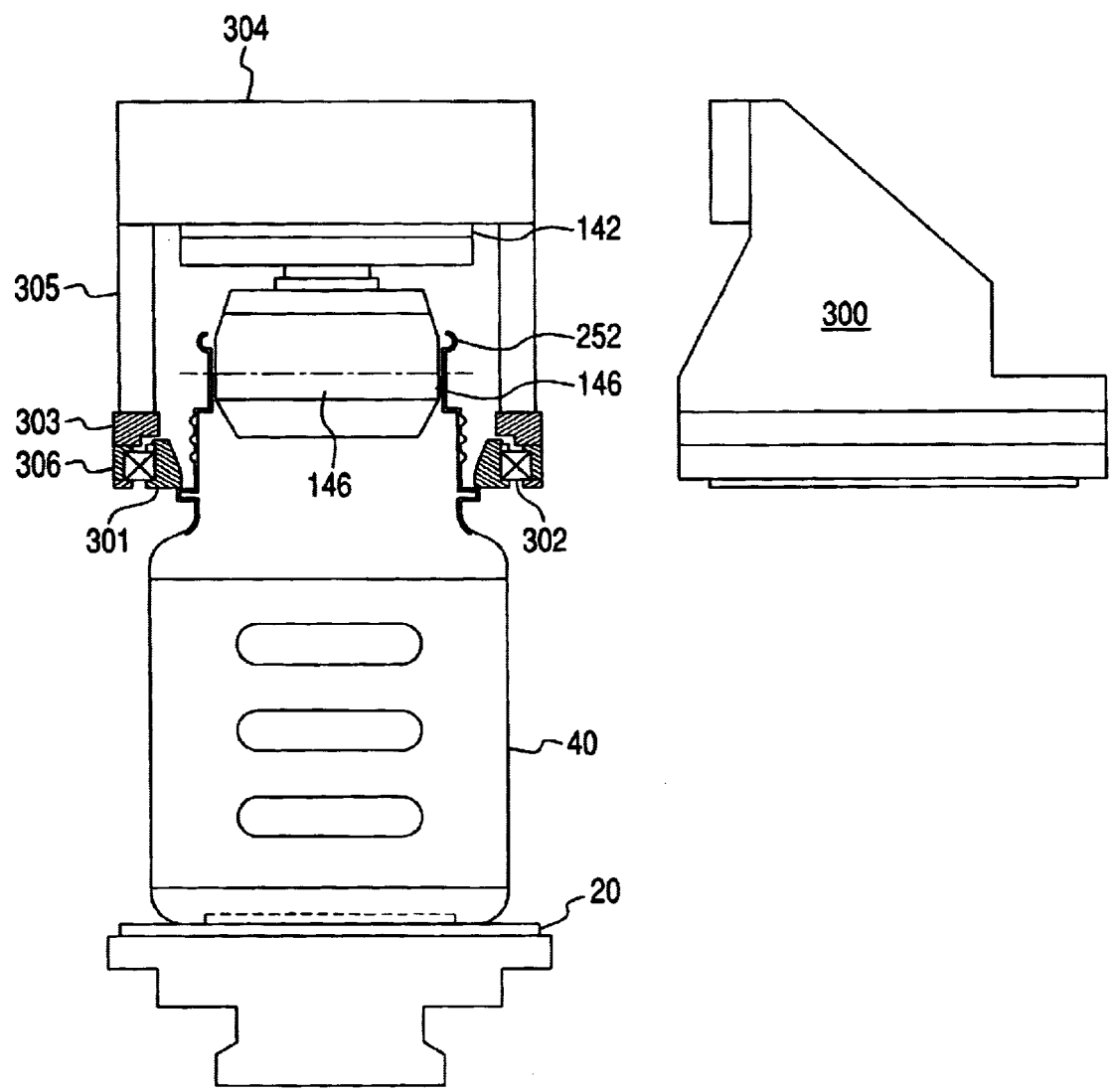
FIG. 8D is a close up of the neck control ring assembly trapping a container on a spindle.

FIG. 8D shows a cross section of the neck control ring assembly 300. It is mounted on the trim head housing 142 via a bracket 304 and two gussets 305. The neck control ring assembly also includes a spacer 303, a bearing 302, a bearing housing 306, and the control ring 301 which is attached to the bearing 302. The control ring is made of material, such as plastic, that is not abrasive to the container. As the neck control ring 301 is lowered with the trim head to engage the container 40, the container 40 is then trapped between the control ring 301 on the top and the spindle 20 at the base of the container 40, thus providing precise location of the container relative to the knives 144 and 146. When the spindle 20 and both knives 144 and 146 rotate (each around its central axis), the control ring 301 keeps pressure on the container 40 during the cutting process to ensure constant precise positioning. Furthermore, the spacer 303 can be removed or replaced with a different thickness spacer to achieve different trimming height depending on the container.

Figure 9:
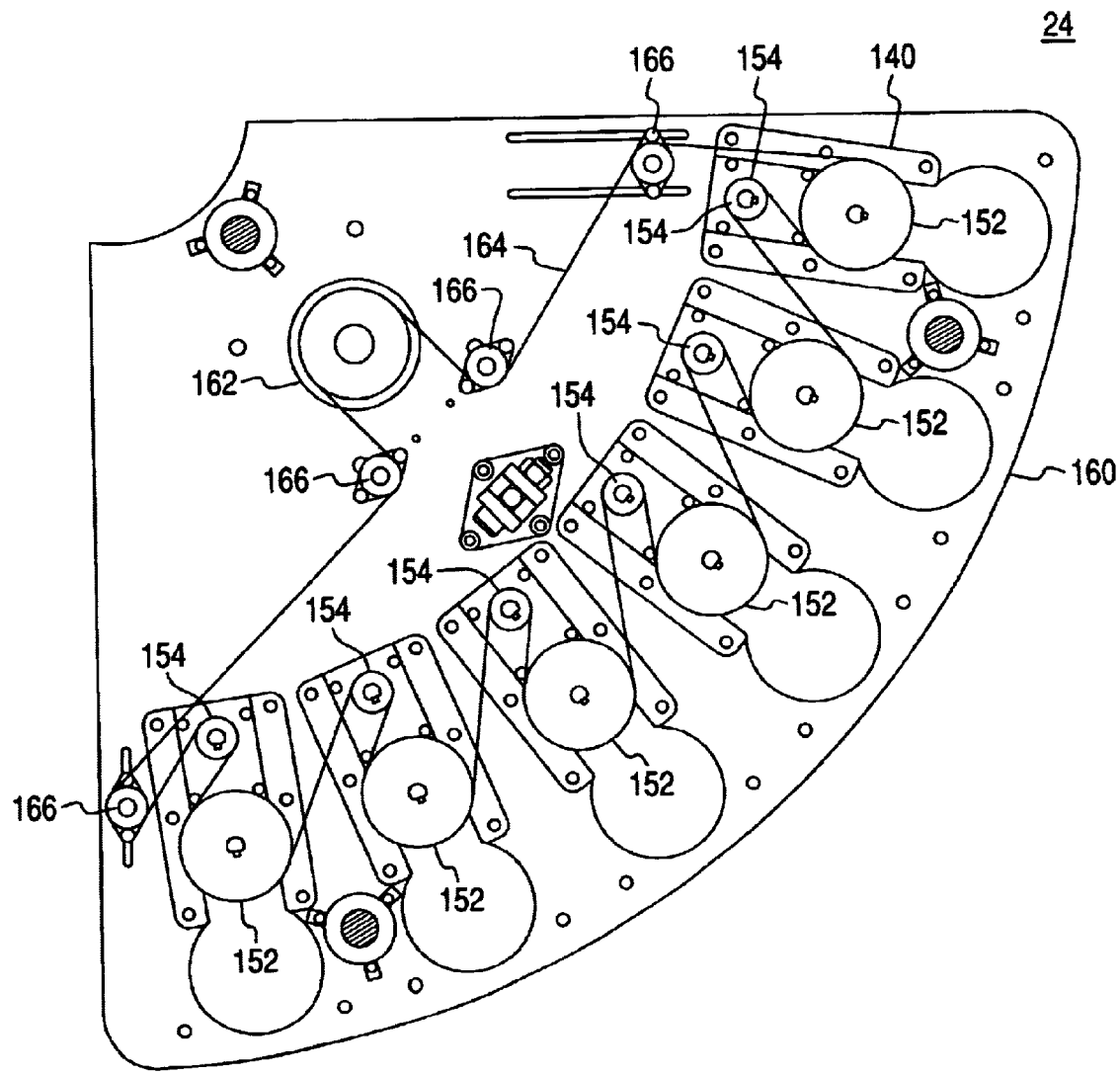
FIG. 9 is top view of a trimming station according to an embodiment of the present invention.

FIG. 9 is top view of a trimming station 24 according to an embodiment of the present invention. Each trimming station 24 includes a plurality of trimming heads 140 attached to and supported by a trim plate 160. Both the C-knife and the inner knife are driven by a motor drive pulley 162 of a motor (not shown in FIG. 9). The motor drive pulley 162 drives the C-knife and inner knife by means of a belt 164 which connects to each of the C-knife drive pulleys 152 and inner knife drive pulleys 154. The belt is distributed to the drive pulleys 152, 154 through idle pulleys 166.

Figure 10:
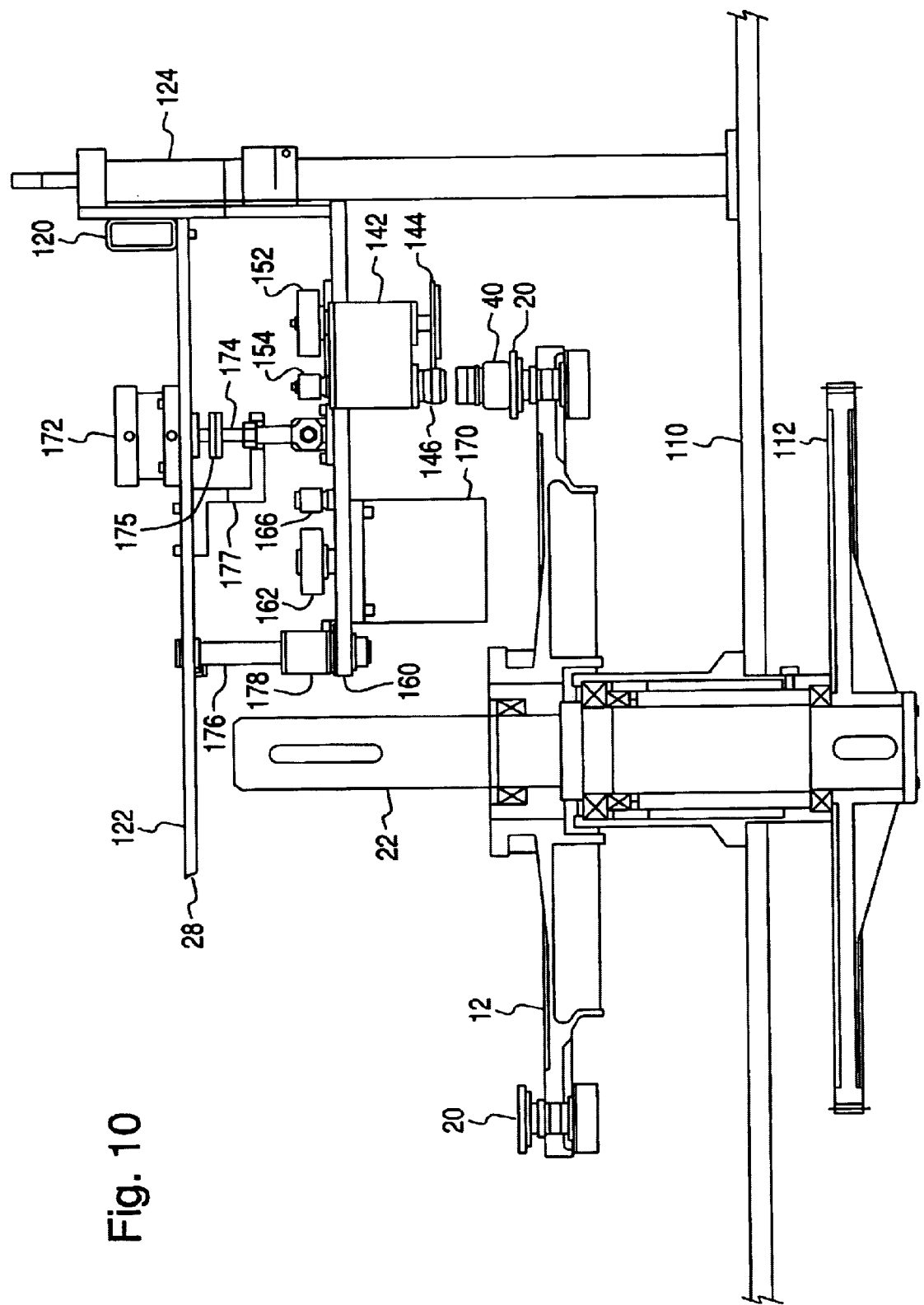
FIG. 10 is a cross-sectional view of a trim station adjacent a carousel according to an embodiment of the invention.

FIG. 10 is a cross-sectional view of a trim station adjacent a carousel 12 according to an embodiment of the invention. The elevator support 28 supports the trim plate 160 of the trim station. The elevator support 28 includes elevator support posts 124 which are supported by the support table 110 beneath the carousel 12. The drive motor 170 for driving the C-knife 144 and inner knife 146 is also illustrated in FIG. 10.

FIG. 10 illustrates a translation mechanism for raising and lowering the trim plate 160 and thus the trim station. The translation mechanism allows the trim station to be in the raised position (as shown) or in the lowered position towards the containers 40 on the spindles 20 of the carousel 12. The translation mechanism in FIG. 10 includes an air cylinder 172. The air cylinder 172 is attached to rod 174 which is attached to the trim plate 160. Thus, by controlling the flow of air into air cylinder 172, the rod 174, the trim plate 160, and the trim station will move up or down. While FIG. 10 shows an air cylinder 172 as part of the translation mechanism which raises and lowers the trim station, the translation mechanism may alternately include different hydraulic or other means of raising and lowering, as is known in the art.

The support plate 122 is also connected to the trim plate 160 via a multiple of guide posts 176 and bushings 178. The guide posts 176 and bushings 178 provide further stability and guidance of the attached trim plate 160 and trim station. As the rod 174 moves up and down, the bushings 178 will move up and down over the guide posts 176, acting to accurately position the trim plate 160 and trim station. The amount of trim station movement may be controlled by the stop nut 175 contacting the stop bracket 177. This movement is controlled by adjusting the stop nut 175 on rod 174. Although the cross-sectional view of FIG. 10 shows a single guide post 176, in general, multiple guide posts and bushings may be used to increase stability and guidance.

FIG. 11 is a cross-sectional view of a second station. Specifically, the second station of FIG. 11 performs a finishing operation, such as curling or edge finishing. The second station is mounted to the support plate 122 of the elevator support 28 (not shown in FIG. 11). Although the cross-sectional view in FIG. 11 shows a region with a single second station head 180, i.e., finishing head, the entire second station will generally employ multiple second station heads 180, i.e., finishing heads.

The finishing heads 180 of the second station may be lowered or raised by a translation mechanism in a similar fashion to the trim station. For example, in FIG. 11 an air cylinder 194 translates a rod 196 up or down according to how the air in the air cylinder 194 is controlled. The air cylinder is supported by the upper finishing head die plate 206. The rod 196 is attached to a lower finishing head die plate 181 via a pivot block 198 and a stop block 201. In turn the finishing heads 180 are attached to the lower finishing head die plate 181. Thus, the finishing heads 180 may be translated up or down by controlling the air in the air cylinder 194. The amount of travel of the finishing heads is controlled by adjusting the stop nuts 205 on the stop rod 203.

The second station includes front and rear clamp plates 182 and 184, respectively. The front and rear clamp plates 182 and 184 are supported by the support plate 122 through clamp support rods 186. In turn, the front and rear clamp plates 182 and 184 each support a finger clamp 188. The respective finger clamps 188 may be translated towards each other by means of air cylinders 190 and piston rods 192. In operation the finger clamps 188 will extend and clamp the container prior to the retraction of the finishing head 180. The finger clamps 190 ensure that the container does not stay with the finishing head due to adhesion as the finishing head is being retracted from the container. In a similar fashion to the trim station, guide posts 202 and bushings 204 also aid in supporting and guiding the lower finishing head die plate 181. The guide posts 202 are attached to upper finishing head die plate 206 which, in turn, are attached to the support plate 122 by spacers 208. The guide posts 202 and bushings 204 provide further stability and guidance to the finishing heads as they are moved up and down by means of the air cylinder 194 and rod 196.

The second station may comprise a single finishing head die plate 181 which supports all of the finishing heads 180. In this case only a single air cylinder 194 need be used to translate the finishing heads 180 up and down. Alternatively, if it is desired to independently translate the finishing heads 180, multiple finishing head die plates 181 may be employed, with a different air cylinder 194 for each finishing hear die plate.

Figure 12A:
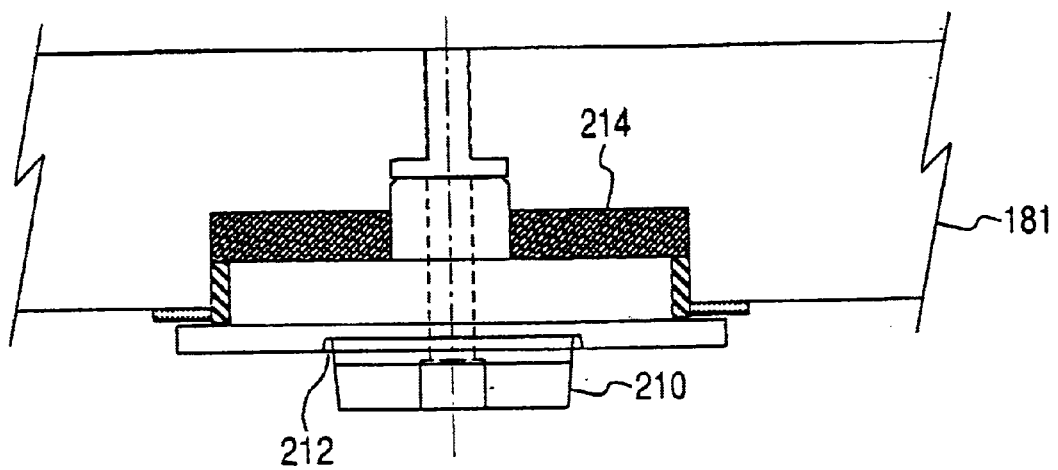
FIG. 12A is a cross-sectional enlarged view of a curling head according to an embodiment of the invention.

FIG. 12A is a cross-sectional enlarged view of the finishing head 180 where the finishing head is a curling head 183. The curling head 183 includes a form tool 210 which when lowered will contact the container to be curled. The form tool 210 includes a contact region 212 which contacts the container to be curled. The contact region 212 has the desired shape to be transferred to the portion of the container which is contacted in the curling operation. Typically, this shape will be smooth as shown in FIG. 12A. However, if desired, a form tool 210 with a contact region 212 with another convenient shape may be used.

Generally, it will be desirable to heat the form tool 210 to aid in the shape transfer during the curling operation. For example, if the containers to be curled are plastic, heating the form tool 210 will tend to soften the plastic contacted during curling and a desired shape may be transferred to the container more efficiently. In this regard the curling head includes a heater 214 which provides heat to the form tool 210. The heater 214 may be, for example, a resistive wire coil which provides heat when electric current is passed through the coil. In this case, electrical wires (not shown) are attached to the heater 214 to provide current for heating the form tool 212 to the desired temperature.

In general the curling operation will proceed as follows. A container 40 is positioned under a curling head 183. The container 40 will be supported and held by a spindle on the carousel 12. Typically, a plurality of containers will be positioned simultaneously under respective curling heads for parallel processing of containers to increase container processing speed. After the containers are positioned under respective curling heads, the curling heads are positioned to contact the respective containers. Typically, the curling heads will be heated to enhance the curling operation. Also the spindles may continuously spin the containers during the curling process to enhance an even distribution of heat to the container. Beneficially, the spinning also produces a consistent curl on the lip of the container to insure sealability.

After the curl on the container has been produced, finger clamps 188 are positioned to contact and hold the container 40. The curling head 183 is then retracted. The finger clamps 188 prevent the container 40 from continuing to adhere to the curling head 183 as the curling head is being retracted. After the curling head 183 is retracted, the finger clamps 188 are retracted and the containers are then conveyed from the curling station.

Alternatively, the second station may perform a second operation other than a curling operation. For example, the second station may perform an edge finishing operation. In this case, the second station of FIG. 11 may employ an edge finishing head with an edge finishing tool instead of a curling head with a curling tool.

Figure 12B:
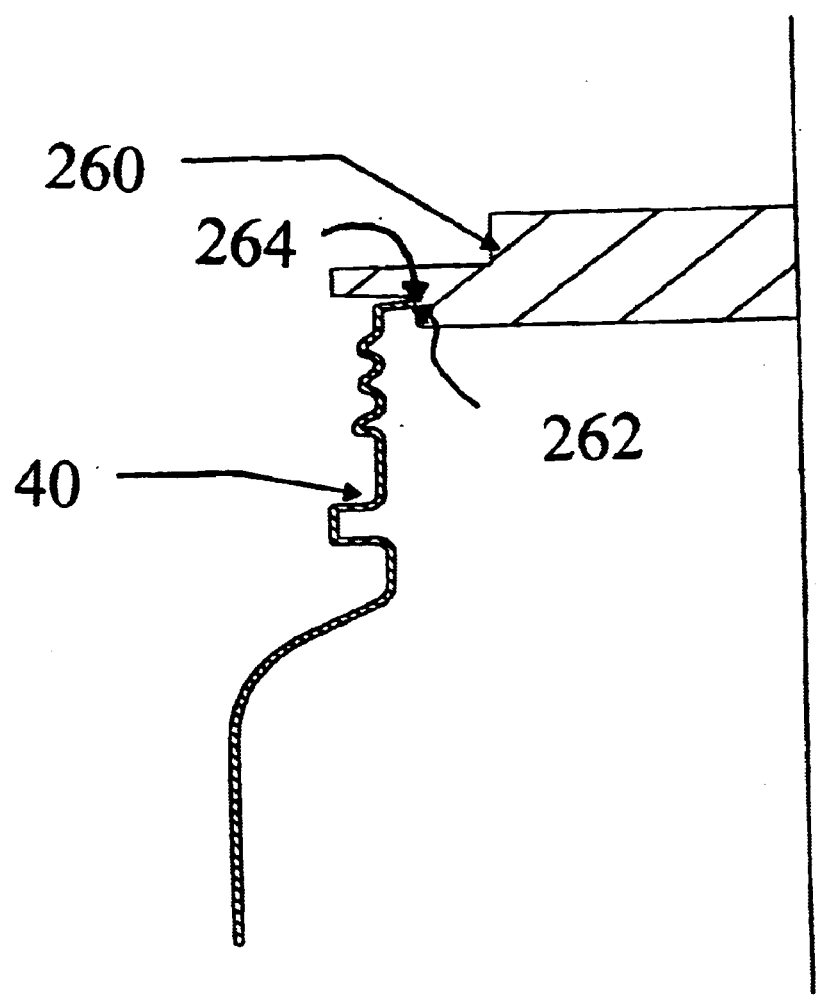
FIG. 12B is a cross-sectional view of a portion of an edge finishing tool of an edge finishing head according to an embodiment of the invention.

FIG. 12B is a cross-sectional view of a portion of an edge finishing tool 260. The edge finishing tool 260 is shown contacting the mouth of a trimmed container 40. In FIG. 12B, the trimmed container has been trimmed to form a preformed sealing surface 262. The sealing surface 262 may be sharp. The edge finishing tool 260 of the edge finishing head contacts the sealing surface 262 and performs an edge finishing operation to remove the sharpness.

The edge finishing tool 260 has a surface 264 disposed for relative rotational contact with the sealing surface 262 for changing a characteristic of the sealing surface 263. In general, the particular shape of the surface 264 of the edge finishing tool will depend on the shape and characteristics of the edge to be finished on the container 40.

In general the edge finishing operation proceeds in a similar fashion to the curling operation. This operation will be described with respect to the second station of FIG. 11 with the edge finishing tool 260 substituted for the curling tool 183 of the curling head 180. A trimmed container 40 is positioned under an edge finishing tool 260. The container 40 will be supported and held by a spindle on the carousel 12. Typically, a plurality of containers will be positioned simultaneously under respective edge finishing tools for parallel processing of containers to increase container processing speed. After the containers are positioned under respective edge finishing tools, the edge finishing tools are positioned within and contact the respective containers. The edge finishing tools may be heated and/or the containers may be spun relative to the tools depending on the desired effect. The spindles may continuously spin the containers during the edge finishing process to enhance an even distribution of heat to the container. Beneficially, the spinning also produces a consistent finished surface on the sealing surface of the container to insure sealability.

After the finished edge on the container has been produced, finger clamps 188 are positioned to contact and hold the container 40. The edge finishing tool 260 is then retracted. The finger clamps 188 prevent the container 40 from continuing to adhere to the edge finishing tool 260 as the edge finishing tool is being retracted. After the edge finishing tool 260 is retracted, the finger clamps 188 are retracted and the containers are then conveyed from the second station.

Figure 13A:
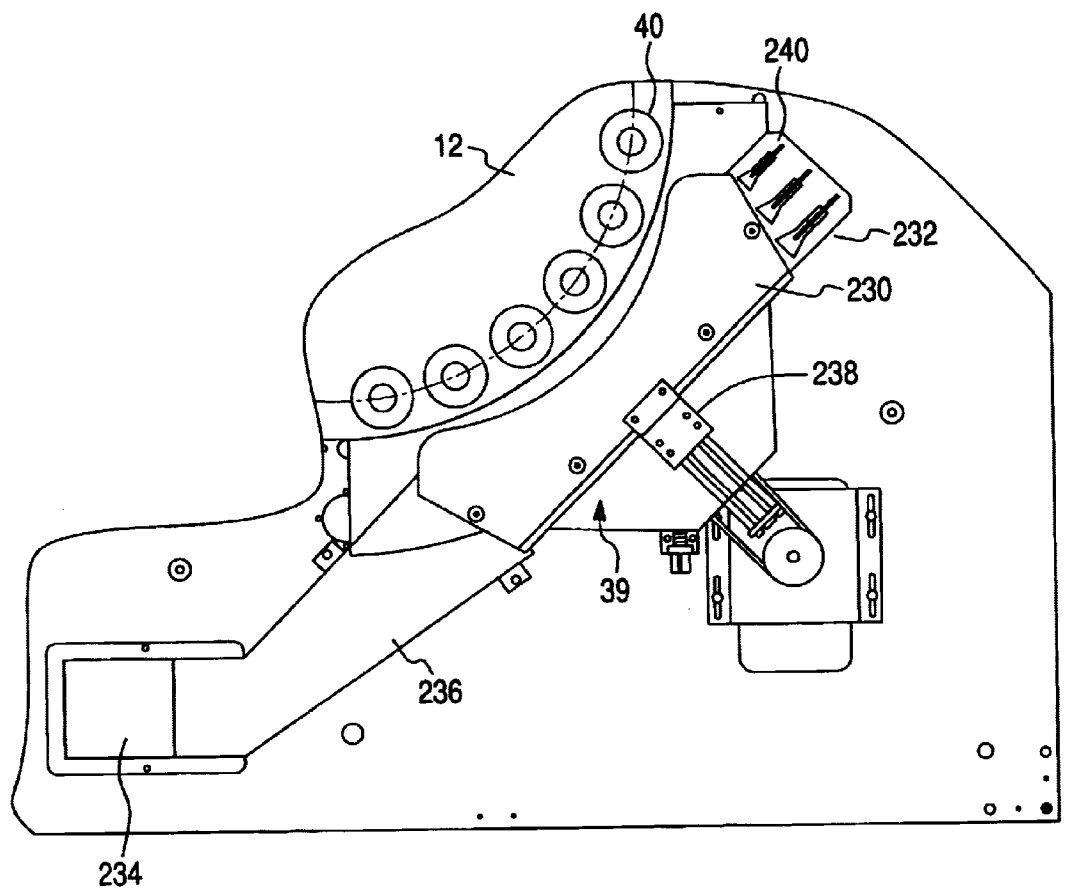
FIG. 13A is a top view of a scrap removal assembly for removing scrap trim sections cut from containers during the trim operation.

FIG. 13A is a top view of a scrap removal assembly 39 for removing scrap trim sections (or scrap rings) cut from containers during the trim operation. The scrap removal assembly 39 is adjacent the carousel 12 which conveys containers 40 as shown in FIG. 13A. The scrap removal assembly is also adjacent the trim station (not shown in FIG. 13A) which is above the carousel 12. The scrap removal assembly 39 includes a scrap removal tray 230 which collects scrap trim sections cut during the trim operation. The scrap trim sections are blown from the scrap removal tray 230 by at least one air jet 240 in an air jet region 232 adjacent the scrap removal tray 230. The scrap trim sections are blown towards a scrap collector 234 which collects the scrap trim sections blown from the scrap removal tray 230.

FIG. 13A shows a scrap chute 236 between the scrap removal tray 230 and the scrap collector 234. The scrap trim sections are blown into the scrap chute 236 and ultimately arrive at the scrap collector 234. The scrap chute 236 allows the scrap to be transferred to the scrap collector 234 positioned at a distance from the scrap removal tray.

The scrap removal assembly also includes a translation mechanism 238 which translates the scrap removal tray 230 under the trim heads to collect the scrap trim sections. The translation mechanism 238 also translates the scrap removal tray away from under the trim heads so that the scrap trim sections may then be blown to the scrap collector 234 via the scrap chute 236. The translation mechanism 238 may be, for example, an air cylinder and piston.

Figure 13B:
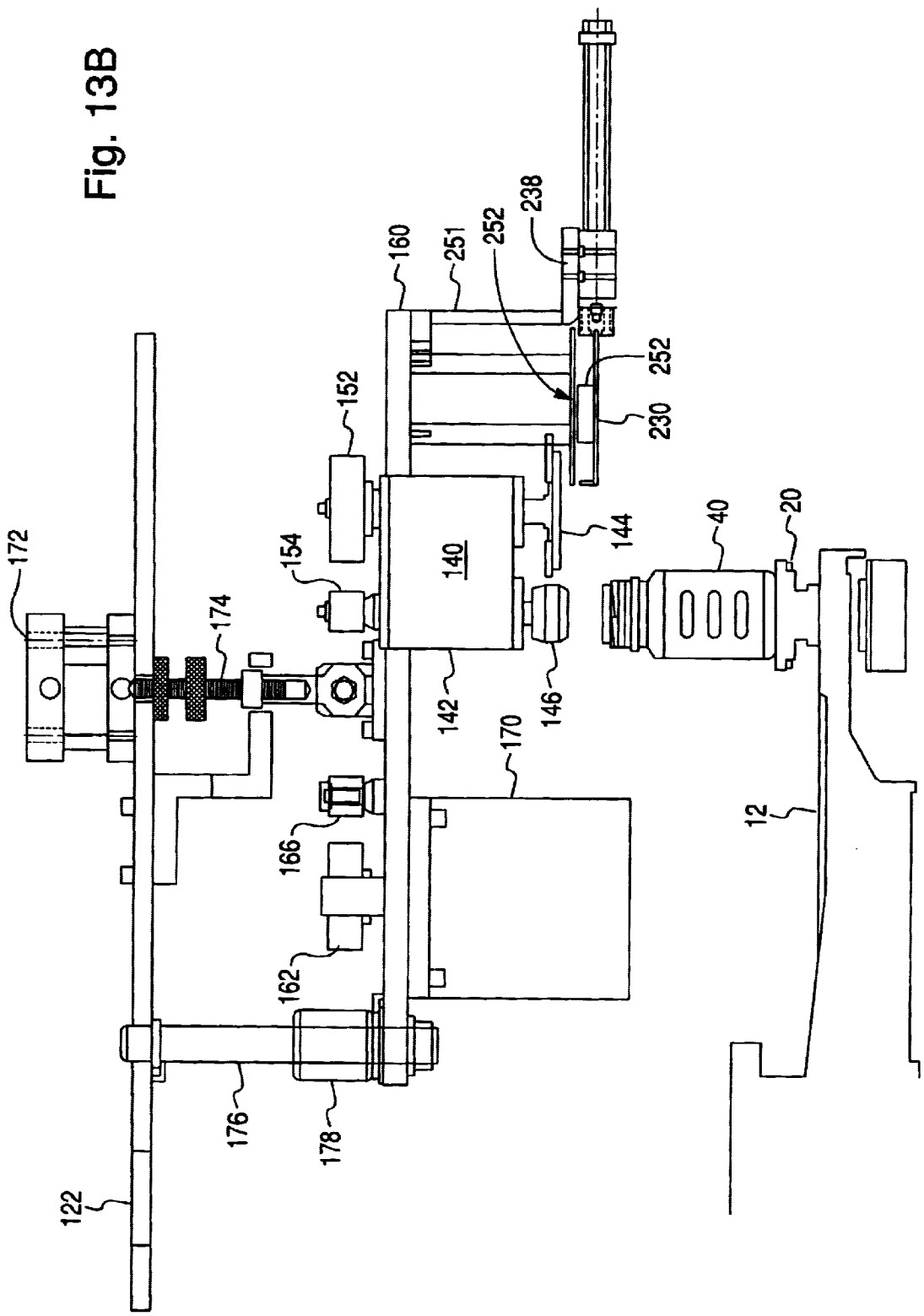
FIG. 13B is a side view of the scrap removal assembly adjacent a trim station.

FIG. 13B is a side view of the scrap removal assembly adjacent a trim station. The scrap removal assembly is attached to the trim plate 160 of the trim station via a bracket 251. A scrap tray cover 250 is also supported from trim plate 160. The translation mechanism 238, which may be for example, an air cylinder and piston, translates the tray under the trim head 140. The tray 230 collects scrap trim sections 252.

The scrap removal assembly operates as follows. After the trim heads have cut scrap trim sections from respective containers, the trim heads are retracted from the containers leaving a gap between the trim heads and the containers. At this point in the process the C-knife will have rotated a portion of a revolution from its home position and will be in an engaged position with the inner knife. Thus, at this point the scrap trim section will be engaged by the trim head.

The scrap removal tray is then translated toward and into the gap between the trim heads and the underlying containers. The scrap removal tray will be positioned directly under the trim heads with engaged scrap trim sections. Then the C-knives are rotated to be in their home position. Thus, the trim sections will no longer be engaged by the trim head and will fall into the scrap removal tray. The scrap removal tray is then translated away from the carousel and trim heads, and the scrap trim sections are blown towards the scrap collector.

Alternatively, the scrap removal assembly could be configured and operated to blow the scrap trim sections to the scrap collector prior to retracting the scrap tray. However, retracting the tray prior to blowing the scrap trim sections to the collector allows the trim station to more quickly begin operation again, and thus saves processing time.

FIG. 1 illustrates an apparatus with processing components for a pretrim, trim, and a second operation integrated in a single apparatus. However, because the pretrim, trim, and second stations are modular, the apparatus according to the present invention may include only one or two of the operation stations instead of all three in a single integrated apparatus. Thus, the present system provides for increased flexibility in processing containers.

The preferred embodiments have been set forth herein for the purpose of illustration. However, this description should not be deemed to be a limitation on the scope of the invention. Accordingly, various modifications, adaptations, and alternatives may occur to one skilled in the art without departing from the scope of the claimed inventive concept.

What is claimed is:

1. An apparatus for trimming and performing a second operation on containers comprising:
   a carousel having a main shaft, which conveys the containers about a central axis of the main shaft;
   a trim station positioned adjacent a first portion of the carousel, the trim station including a plurality of trimming heads which trim respective containers conveyed around the carousel thereby producing trimmed containers;
   a second station positioned adjacent a second portion of the carousel, the second station including a plurality of second station heads which operate on the trimmed containers; and
   at least one support supporting both the trim station and the second station directly above the carousel.

2. The apparatus of claim 1, further comprising:
   an infeed assembly which conveys the containers towards the carousel.

3. The apparatus of claim 2, wherein the infeed assembly comprises one of a conveyor, starwheel, and feed screw.

4. The apparatus of claim 2, wherein the infeed assembly comprises:
   a feed screw and/or a starwheel which sets a timing of the containers to the carousel; and
   an infeed conveyor which conveys the containers to the feed screw and/or the starwheel.

5. An apparatus for trimming and performing a second operation on containers comprising:
   a carousel having a main shaft, which conveys the containers about a central axis of the main shaft;
   a trim station positioned adjacent a first portion of the carousel, the trim station including a plurality of trimming heads which trim respective containers conveyed around the carousel thereby producing trimmed containers;
   a second station positioned adjacent a second portion of the carousel, the second station including a plurality of second station heads which operate on the trimmed containers; and
   a pretrim assembly which pretrims the containers and conveys the containers to the carousel.

6. The apparatus of claim 5, the pretrim assembly further comprising:
   a starwheel having a starwheel central axis which engages the containers and conveys the containers around the starwheel central axis;
   a guide which guides the containers being conveyed around the starwheel central axis; and
   a pretrim blade which pretrims the containers.

7. The apparatus of claim 1, further comprising a discharge assembly which discharges containers from the apparatus after they have been operated on.

8. The apparatus of claim 7, wherein the discharge assembly includes a starwheel.

9. An apparatus for trimming and performing a second operation on containers comprising:
   a carousel having a main shaft, which conveys the containers about a central axis of the main shaft;
   a trim station positioned adjacent a first portion of the carousel, the trim station including a plurality of trimming heads which trim respective containers conveyed around the carousel thereby producing trimmed containers, wherein each of the trimming heads comprises:
      a C-knife, wherein the C-knife has a blade with a C shape; and
      an inner knife disposed in relation to the C-knife, where the inner knife and the C-knife trim a respective container by simultaneously engaging the respective container; and
   a second station positioned adjacent a second portion of the carousel, the second station including a plurality of second station heads which operate on the trimmed containers.

10. The apparatus of claim 1, wherein trim station comprises a scrap removal system adjacent the trimming heads which removes trim segments cut from the containers by the trimming heads.

11. An apparatus for trimming and performing a second operation on containers comprising:
    a carousel having a main shaft, which conveys the containers about a central axis of the main shaft;
    a trim station positioned adjacent a first portion of the carousel, the trim station including a plurality of trimming heads which trim respective containers conveyed around the carousel thereby producing trimmed containers;
    a second station positioned adjacent a second portion of the carousel, the second station including a plurality of second station heads which operate on the trimmed containers; and
    wherein the carousel further comprises: a plurality of spindles, each of the plurality of spindles having a spindle support which holds a respective one of the containers, wherein each of the spindle supports rotates around a central axis of its respective spindle.

12. The apparatus of claim 11, wherein each of the plurality of spindles is connected to a vacuum hose, and each of the spindle supports holds a respective container by means of a vacuum drawn by the vacuum hose.

13. The apparatus of claim 1, wherein the plurality of second station heads of the second station perform a finishing operation on the trimmed containers.

14. The apparatus of claim 13, wherein the finishing operation is an edge finishing operation.

15. The apparatus of claim 1, wherein the support comprises a single support plate supporting both the trim station and the second station.

* * * * *